(12) United States Patent
Märkl

(10) Patent No.: US 8,746,096 B2
(45) Date of Patent: Jun. 10, 2014

(54) DRIVE ARRANGEMENT FOR A MOTOR VEHICLE

(75) Inventor: Johann Märkl, Ingolstadt (DE)

(73) Assignee: Audi AG, Ingolstadt (DE)

( * ) Notice: Subject to any disclaimer, the term of this patent is extended or adjusted under 35 U.S.C. 154(b) by 149 days.

(21) Appl. No.: 13/370,932

(22) Filed: Feb. 10, 2012

(65) Prior Publication Data

US 2012/0240699 A1   Sep. 27, 2012

(30) Foreign Application Priority Data

Feb. 14, 2011 (DE) .......................... 10 2011 011 171

(51) Int. Cl.
*F16H 3/08* (2006.01)
*F16H 3/12* (2006.01)

(52) U.S. Cl.
USPC ................................. 74/325; 74/330; 74/333

(58) Field of Classification Search
CPC ......... F16H 3/006; F16H 3/091; F16H 3/089; F16H 3/08; F16H 2200/0086; F16H 37/08; F16H 37/06; F16H 37/065; F16H 37/0813; F16H 37/0826
USPC ................ 74/330, 331, 333, 340, 664, 665 F, 74/665 G, 325
See application file for complete search history.

(56) References Cited

U.S. PATENT DOCUMENTS

| | | | |
|---|---|---|---|
| 4,610,177 A * | 9/1986 | Mahoney | 74/330 |
| 4,723,622 A | 2/1988 | Toshikuni et al. | |
| 5,383,375 A * | 1/1995 | Ogawa et al. | 74/330 |
| 5,392,665 A * | 2/1995 | Muller | 74/330 |
| 5,640,882 A * | 6/1997 | Mueller | 74/359 |
| 5,761,961 A * | 6/1998 | Krauss et al. | 74/333 |
| 6,030,312 A * | 2/2000 | Nesbitt et al. | 475/206 |
| 6,427,548 B1 * | 8/2002 | Leimbach et al. | 74/331 |
| 6,546,830 B2 * | 4/2003 | Kanazawa | 74/665 G |
| 6,551,211 B2 * | 4/2003 | Kanazawa | 475/206 |
| 6,595,077 B1 * | 7/2003 | Geiberger et al. | 74/330 |
| 7,231,843 B2 * | 6/2007 | Gumpoltsberger et al. | 74/329 |
| 7,258,032 B2 * | 8/2007 | Kim | 74/330 |
| 7,377,191 B2 * | 5/2008 | Gitt | 74/330 |
| 7,841,252 B2 * | 11/2010 | Remmler | 74/330 |
| 8,011,460 B2 * | 9/2011 | Hobel | 180/65.22 |
| 8,151,662 B2 * | 4/2012 | Fitzgerald et al. | 74/330 |

(Continued)

FOREIGN PATENT DOCUMENTS

| | | |
|---|---|---|
| DE | 14 55 901 A1 | 5/1969 |
| DE | 44 17 372 A1 | 11/1995 |

(Continued)

*Primary Examiner* — Troy Chambers
*Assistant Examiner* — Jude Agendia
(74) *Attorney, Agent, or Firm* — Henry M. Feiereisen LLC

(57) ABSTRACT

A drive arrangement for a motor vehicle includes two driven axles, wherein at least one of the axles can be connected and disconnected, with a variable speed transmission having at least one input shaft, two driven shafts, each driven shaft driving a respective axle, and several forward gears and optionally one reverse gear which can be switched via gear wheels and synchronous couplings. The drive arrangement can be easily switched between different drive modes by dividing the variable speed transmission into two sub-transmissions, of which one sub-transmission drives exclusively a first axle via a portion of the forward gears and the one driven shaft and the second sub-transmission drives both driven shafts via the remaining portion of the forward gears and optionally the reverse gear.

14 Claims, 3 Drawing Sheets

(56) References Cited

U.S. PATENT DOCUMENTS

| | | | |
|---|---|---|---|
| 8,627,736 B2 * | 1/2014 | Maerkl | 74/325 |
| 2007/0022835 A1 * | 2/2007 | Kilian et al. | 74/340 |
| 2007/0214904 A1 * | 9/2007 | Ohnemus | 74/330 |
| 2010/0192717 A1 * | 8/2010 | Gitt | 74/330 |

FOREIGN PATENT DOCUMENTS

| | | |
|---|---|---|
| DE | 199 60 621 A1 | 6/2001 |
| DE | 102006050972 | 4/2008 |
| EP | 683 065 A1 | 11/1995 |
| EP | 1 914 105 A2 | 4/2008 |

* cited by examiner

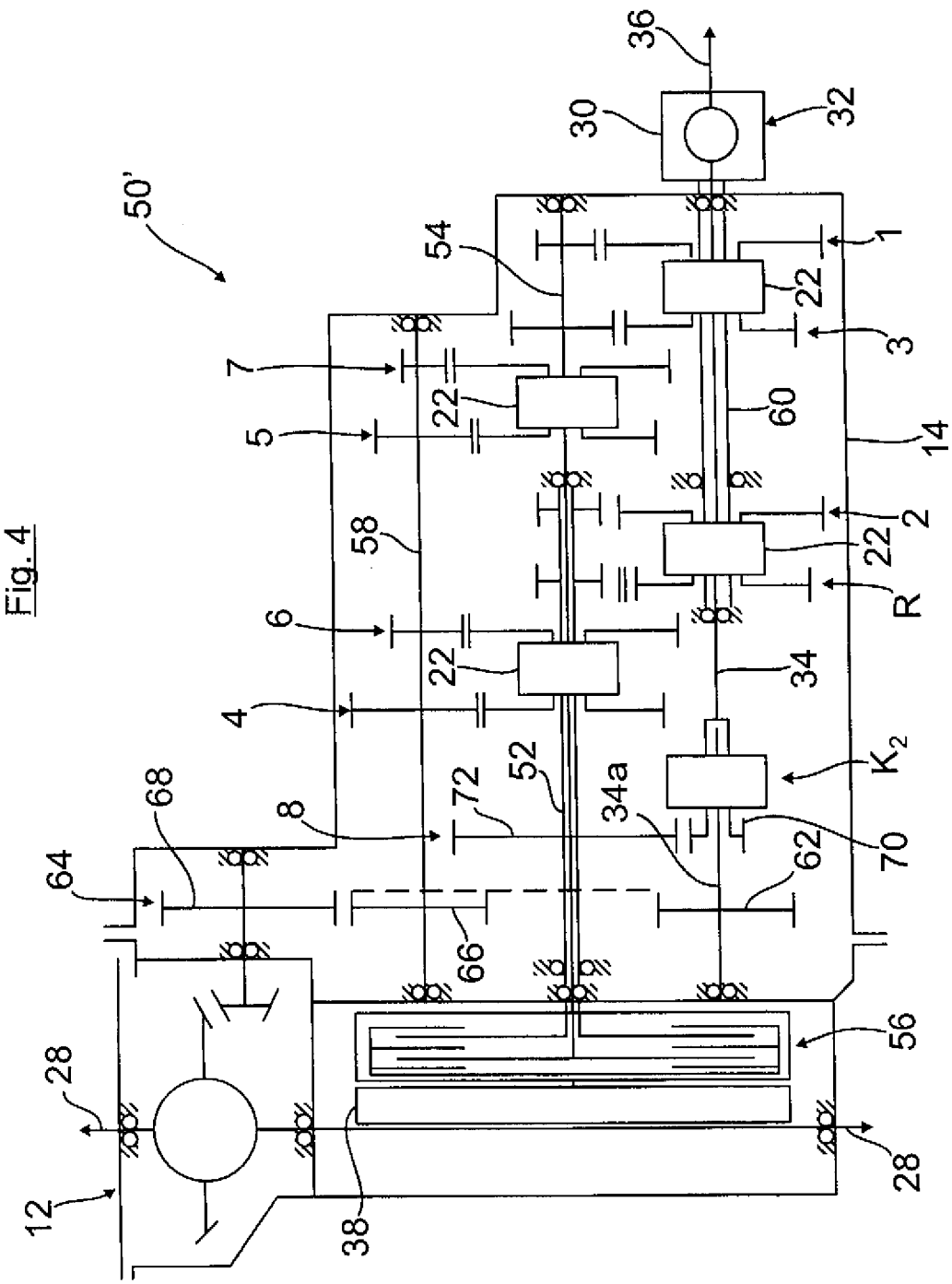

DRIVE ARRANGEMENT FOR A MOTOR VEHICLE

CROSS-REFERENCES TO RELATED APPLICATIONS

This application claims the priority of German Patent Application, Serial No. 10 2011 011 171.9, filed Feb. 14, 2011, pursuant to 35 U.S.C. 119(a)-(d), the content of which is incorporated herein by reference in its entirety as if fully set forth herein.

BACKGROUND OF THE INVENTION

The invention relates to a drive arrangement for a motor vehicle with two driven axles.

Drive arrangements of this type are essentially divided into permanent drive systems with an interposed interaxle differential for preventing stress in drive systems and so-called hang-on systems with a viscous clutch or the like that is integrated in the drive train to one axle of the motor vehicle. In the latter system, the second axle is activated only when wheel slip is detected.

An additional clutch for the overdrive for a drivable tool, such as an earth mover, was already proposed in DE 14 55 901 A1, for example for transporting the tool to another site, which automatically disengages the all-wheel drive when the overdrive is engaged and conducts the drive torque to only one axle. The reason for this measure is, more particularly, to disconnect the particularly highly stepped-up transmission part used in normal operation to prevent high rotation speed loads in overdrive.

It is an object of the invention to propose a drive arrangement of the generic type, which provides an advantageous gearbox efficiency in motor vehicles with several forward gears (for example with up to eight gears) and an output to both axles and a simple, easily controllable gear structure.

SUMMARY OF THE INVENTION

This object is attained with the invention by a drive arrangement for a motor vehicle having two driven axles, wherein at least one of the two driven axles is constructed for connection and disconnection. The drive arrangement includes a variable speed transmission having at least one input shaft, two driven shafts, with each driven shaft driving a corresponding axle of the two driven axles of the motor vehicle, and several forward gears and optionally one reverse gear constructed to be switched via gear wheels and synchronous clutches.

According to the invention, it is proposed to divide the change speed gearbox into two partial gearboxes, wherein one partial gearbox drives exclusively a first axle via several forward gears and the one driven shaft and the second partial gear drives both driven shafts via the other forward gears and optionally the reverse gear. It is the intent of the invention to drive both axles with higher output torque in the forward gears and to drive only the one axle of the motor vehicle with lower output torque in the forward gears. The aforementioned partial gearboxes may be only functionally implemented through suitable linkage of the gear elements and may therefore not require additional costs.

In particular, it is proposed that in a change speed gearbox with several, for example at least five forward gears, at least the lowest forward gear or several low forward gears, for example two or three low forward gears, and optionally the reverse gear are associated with the second partial gearbox driving both driven shafts, whereas the higher stepped-up forward gears, at least one of the highest gears, may only drive one axle, for example the front axle of the motor vehicle.

The two partial gearboxes may be housed in a common gearbox housing, wherein the two driven shafts which are coaxially supported in the gearbox housing may be connectable via only a single additionally required switchable clutch. This additional clutch is required, in particular, when the entire axle drive can be stopped by a suitable decoupling device on the other axle or the other axle drive.

In an advantageous embodiment of the invention, the switchable clutch may be a dual-synchronous clutch, wherein the two driven shafts are coupled with one another in one switching position and an additional forward gear, in particular a step-up E-gear, can be added in the other switch position, which drives only the one axle of the motor vehicle via the first driven shaft. When an E-gear is already provided in the change speed gearbox, then the switching clutch switching the E-gear may be modified accordingly.

In another advantageous design of the gearbox, the second driven shaft of the change speed gearbox may be a hollow shaft driving a downstream interaxle differential having one driven element connected with the disconnectable axle and another driven element which passes through the hollow driven shaft in reverse gear and which can be coupled with the first driven shaft via the switchable clutch and/or the dual-synchronous clutch. This results in a particularly simple arrangement of the interaxle differential, which can be easily adapted downstream to the change speed gearbox and which may be omitted without substantial changes in the gear structure when all-wheel drive has not been requested.

In another advantageous embodiment of the invention, the change speed gearbox may be a dual-clutch gearbox with two coaxially supported input shafts which can be alternatingly driven by the engine via the dual clutch and which, when divided into two partial gearboxes, drive only the one axle of the motor vehicle via the first partial gearbox with several forward gears and drive the second driven shaft, which is arranged axis-parallel to the first driven shaft, via the second partial gearbox via several forward gears and optionally a reverse gear, wherein the second driven shaft is additionally coupled with the first driven shaft via a gear wheel set. With suitable design and association of the forward gears with the two input shafts and the two driven shafts, the two drive modes (exclusively one axle or both axles) can be associated with the lower and higher forward gears without an additional clutch.

The second driven shaft can also be constructed as a hollow shaft and drive the differential housing of a downstream interaxle differential, which drives the second axle of the motor vehicle via a first output shaft and which is drivingly coupled in reverse gear via a second output shaft passing through the hollow shaft with the first driven shaft via the gear wheel set.

In addition, for attaining a simple structure of the gearbox, the switchable idler gear wheels of the forward gears driving both axles and optionally the reverse gear of the second partial gear may be arranged on the second driven shaft constructed as a hollow shaft, thereby establishing the drive connection to the first driven shaft and the second driven shaft and/or the output shaft for driving both axles without an additional switchable clutch.

Alternatively, a dual clutch may be arranged in the second driven shaft or in the output shaft of the interaxle differential for driving the one axle of the motor vehicle, wherein the dual clutch couples in one switching position the two partial gearboxes with each other and actively connects the other switching position an additional forward gear with an idler gear wheel on the driven shaft and/or on the output shaft and with a fixed gear wheel on the one input shaft, allowing an additional forward gear, in particular an E-gear, to be switched simultaneously with an additional clutch.

Lastly, when a dual-clutch gearbox is employed and the motor vehicle is in a driving condition with only one driven axle and with wheel slip, a forward gear driving both axles may be temporally connected via the second clutch of the dual-clutch device when a clutch is controlled with slip. Such measure can be relatively easily implemented, because such dual clutches (mostly hydraulically controlled multi-plate clutches) are already operated with slip control for providing comfortable gear shifting with uninterrupted power delivery.

BRIEF DESCRIPTION OF THE DRAWING

Several exemplary embodiments of the invention will now be described in more detail. The schematic drawing shows in:

FIG. 4 the dual clutch gearbox of FIG. 3, however with an additional dual-synchronous clutch, with which either an additional forward gear can be connected or the drive shafts driving both axles can be coupled.

DETAILED DESCRIPTION OF PREFERRED EMBODIMENTS

Figure 1:
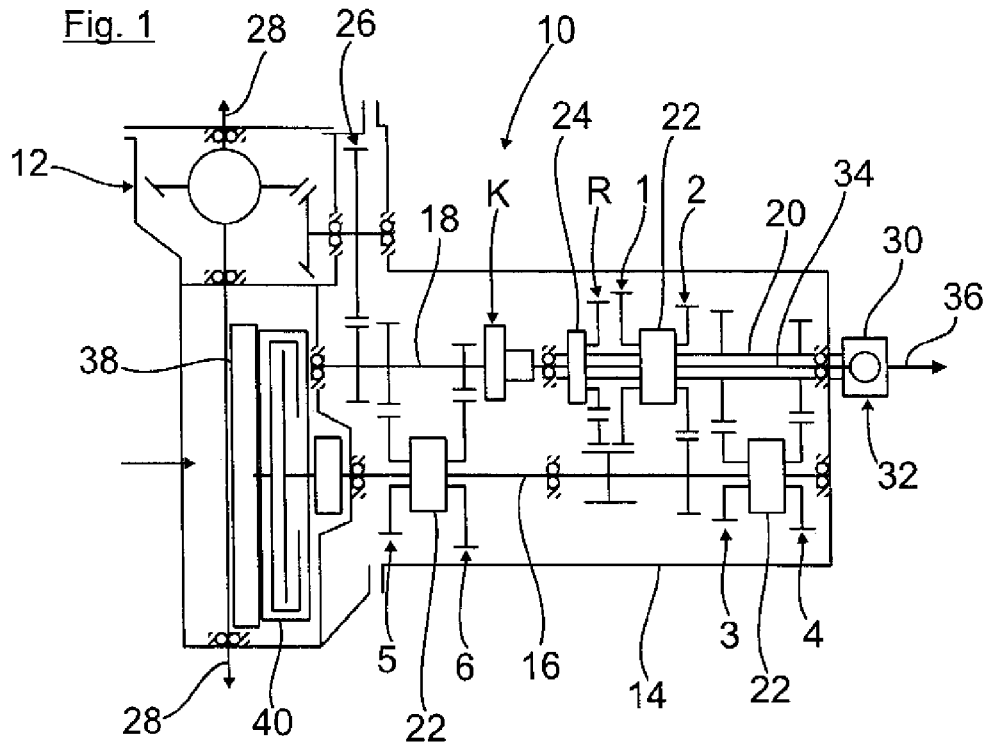
FIG. 1 in form of a block diagram, a change speed gearbox designed for front wheel drive and a drive of a rear axle with several forward gears 1 to 6 and a reverse gear R, wherein the gears R, 1 to 4 drive both driven shafts as partial gearbox, whereas the remaining gears drive only the front axle as a second partial gearbox.

FIG. 1 shows in form of a block diagram a change speed gearbox 10 for a drive arrangement for motor vehicles, with an integrated front axle differential 12 having a housing 14 in which a gear input shaft 16 and axis-parallel thereto two coaxially arranged driven shafts 18, 20 are rotatably supported.

The change speed gearbox 10 has forward gears 1 to 6 and a reverse gear R, which are formed from fixed gear wheels and idler gear wheels (without reference symbol) and arranged on the input shaft 16 and the driven shafts 18, 20, via which dual-synchronous clutches (generally indicated with 22) and a single synchronous clutch 24 for the reverse gear R can be alternatingly activated. A reversing gear is connected in the gear stage R in a conventional manner. The synchronous clutches 22, 24 of the gearboxes are constructed in a conventional manner.

The driven shaft 18 of the change speed gearbox 10 drives via an additional gear wheel set 26 the laterally attached differential 12, which drives the front wheels of the motor vehicle via half shafts 28 extending transversely to the input shaft 16.

The additional driven shaft 20 is constructed as a hollow shaft operating on the differential housing 30 of a schematically indicated interaxle differential 32. The one output shaft 36 of the interaxle differential 32 is drivingly connected with the rear differential driving the rear wheels of the motor vehicle (not illustrated), whereas the second output shaft 34 passes in reverse gear through the hollow shaft 20 to a switchable interlocking clutch K, with which the driven shaft 18 can be coupled with the output shaft 34.

The clutch K is also constructed as a single synchronous clutch. The switching elements of the change speed gearbox 10 actuating the clutch K and the synchronous clutches 22, 24 are not illustrated; however, they are constructed so that the clutch K is automatically engaged when the gears R and 1 to 4 are engaged, whereas the clutch K is disengaged in the gears 5 and 6.

The input shaft 16 driven by the engine of the motor vehicle via a flywheel 38 and a separation clutch 40 drives as a functionally first partial gearbox the driven shaft or a hollow shaft 20 via the forward gears 1 to 4 and the reverse gear R, wherein the driven shaft or a hollow shaft 20 drives the rear wheels of the motor vehicle via the interaxle differential 32 and the output shaft 34, 36, and the driven shaft 18 drives the front wheels of the motor vehicle in all-wheel-drive, when the clutch K is engaged.

When the clutch K is disengaged, the input shaft 16 drives in the forward gears 5 and 6 as second partial gearbox only the driven shaft 18 or the front wheels of the motor vehicle via the front differential 12, while the output shaft 34 and thus functionally the driven shaft 20 with the interaxle differential 32 is uncoupled.

The motor vehicle is hence driven in all gears R and 1 to 4 with all-wheels both forward and in reverse when the synchronous clutch 22, 24 is suitably switched and the clutch K is automatically engaged, whereas when the forward gears 5 and 6 are engaged and the clutch K is disengaged, only the front wheels of the motor vehicle are driven.

Figure 2:
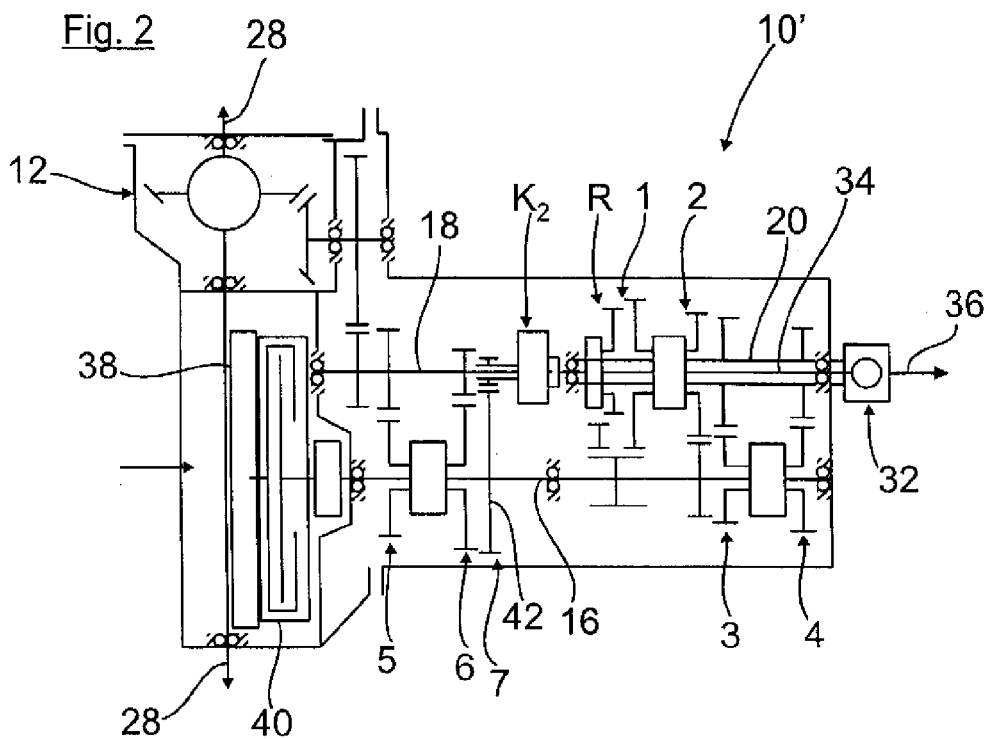
FIG. 2 the change speed gearbox of FIG. 1, with an additional forward gear which can be activated via a dual-synchronous clutch that couples either both driven shafts or connects the forward gear.

FIG. 2 shows another change speed gearbox 10' of the type described in FIG. 1 wherein, however, an additional stepped-up $7^{th}$ forward gear is provided. This forward gear is composed of a gear wheel set with a fixed gear wheel 42 on the input shaft and an idler gear wheel 44 on the driven shaft 18.

The additional $7^{th}$ forward gear can be connected via the clutch K2 which is implemented as a conventional dual-synchronous clutch and which couples, starting from a neutral position, either the output shaft 34 of the interaxle differential 32 with the driven shaft 18 or activates in the other switch position the gear wheel stage 42, 44 for the $7^{th}$ gear.

By modifying the clutch K2 and with a corresponding design of the switching elements of the change gear 10', the $7^{th}$ gear is especially constructed as a low-revolution overdrive gear and can be connected in addition to a switch from all-wheel-drive (gears R and 1 to 4) to front wheel drive (gears 5 to 7). In the gears 5 and 6 the clutch K2 is hereby in a neutral position, whereas the clutch K2 is in the gears R and 1 to 4 in the switch position coupling both shafts 16, 34 with each other or in the opposite switch position activating the $7^{th}$ gear.

Figure 3:
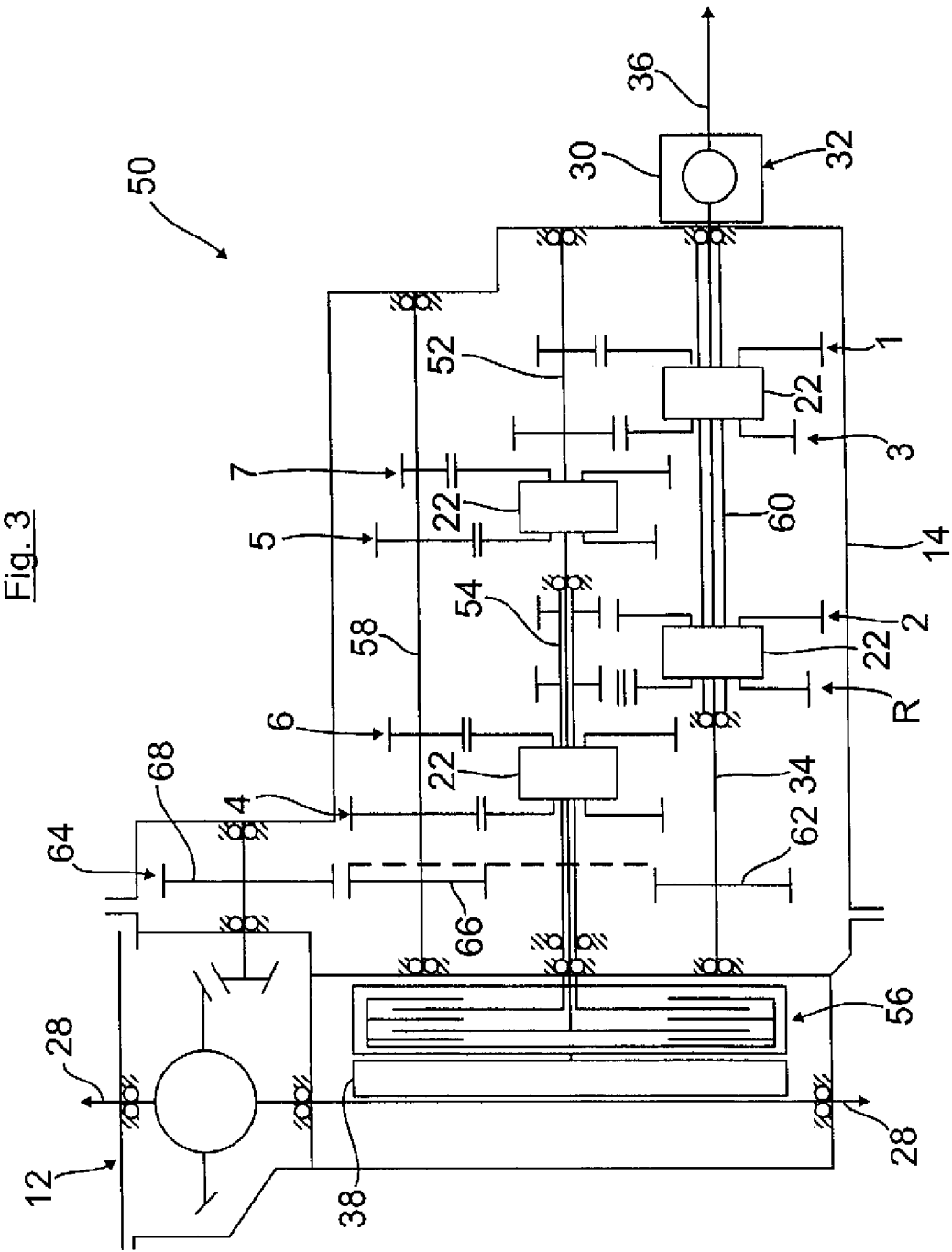
FIG. 3 a dual clutch gearbox having again two partial gearboxes, wherein the gears R and 1 to 3 drive both axles of the motor vehicle and the gears 4 to 7 drive only the front axle.

FIG. 3 shows an alternative embodiment of a change speed gearbox 50 which is from the embodiment in FIGS. 1 and 2 and is constructed as a dual-clutch gearbox. Functionally identical parts are indicated with identical reference symbols.

The change speed gearbox 50 has two coaxial gearbox input shafts 52, 54, with one of the input shaft 54 constructed as a hollow shaft through which the second input shaft 52 extends.

The two input shafts 52, 54 are driven via a dual clutch 56 which alternatingly transfers the drive torque from the engine via a flywheel (or ZMS) 38 to the input shafts 52, 54. The dual clutch 56 is constructed in a conventional manner from two wet-running, hydraulically controlled multi-disk clutches.

The input shafts 52, 54 drive two driven shafts 58, 60 via the gear wheel sets R and 1 to 7 having respective idler gear wheels and fixed gear wheels (without reference symbols), with the driven shaft 60 again constructed as a hollow shaft.

The forward gears 1 to 7 and the reverse gear R can be activated via dual-synchronous clutches 22 by unillustrated switching elements.

The hollow driven shaft 60 drives the differential housing 30 of an interaxle differential 32 having an output shaft 36 which drives (not illustrated) a rear axle differential or the rear wheels of the motor vehicle.

The second output shaft 34 of the interaxle differential 32 passes in reverse gear through the driven shaft 60 towards the front and carries a gear wheel 62 of a gear wheel drive 64, with an additional gear wheel 66 on the driven shaft 58 and a gear wheel 68 driving the front axle differential 12.

The driven shafts 58, 60 with the output shaft 34 are arranged relative to the input shafts 52, 54 of the gearbox 50 with a mutual offset along the periphery such that their driven gear wheels 62, 64 are—different from the illustration in FIG. 3—always in engagement with the gear wheel 68 (indicated by the dashed line).

The idler gear wheels of the gear stages 4, 6, 5, 7 which can be switched via the synchronous clutches 22 are arranged on the input shafts 52, 54, whereas their fixed gear wheels are attached on the driven shaft 58 as indicated.

In addition, the idler gear wheels of the gear stages R, 1 to 3 are supported on the hollow driven shaft 60 and can be switched via the additional synchronous clutches 22, whereas the corresponding fixed gear wheels are arranged on the input shafts 52, 54.

This arrangement produces functionally two partial gearboxes, with one of the gearboxes driving in the forward gears 4 to 7 only the front axle differential 12, whereas the output shaft 34, the interaxle differential 32 and the driven hollow shaft 60 are switched driveless (the hollow driven shaft 60 can rotate freely).

In the gear stages R and 1 to 3, the input shafts 52, 54 alternatingly drive the driven shaft 60 and from there via the interaxle differential 32 the output shaft 36 for the rear wheels and the output shaft 34, which additionally drives the front axle differential 12 or the front wheels of the motor vehicle via the gear wheel set 64.

The forward gear stages 1 to 7 associated with the input shafts 52, 54 and the driven shafts 58, 60 are designed in a manner known from dual-clutch gearboxes, wherein the respective next higher forward gear (for example from 3 to 4) is associated in the flux of force with a respective other input shaft (for example gear stage 3 via the input shaft 52, gear stage 4 via the input shaft 54, etc.) and hence alternatingly activatable via the two separation clutches of the dual clutch 56.

With a corresponding design of the electronic control of the gearbox 50 and by monitoring of, among others, the wheel slip of the driven wheels of the motor vehicle, the $3^{rd}$ forward gear can be connected when in the $4^{th}$ forward gear (only the front axle is driven) and when an impermissible wheel slip on the front wheels is detected, by engaging the corresponding synchronous clutch 22 and through slip-controlled engagement of the second separation clutch, thereby additionally applying drive torque to the rear wheels. It will be understood that this switching operation can only be temporarily performed when wheel slip is large due to the existing rotation speed differences between the two gear stages.

FIG. 4 shows another dual-clutch gearbox 50' which is only described to the extent as the dual-clutch gearbox 50' is different from the dual clutch gearbox 50 of FIG. 3. Identical components are indicated with identical reference symbols.

According to FIG. 4, a dual clutch K2 is connected in the output shaft 34 between the interaxle differential 32 and the output gear wheel 62 of the gear wheel stage 64. The dual clutch K2 interconnects, starting from a neutral position, in one switch position the output shaft 34 and couples in the other switch position an idler gear wheel 70 which is rotatably supported on the front section 34a of the output shaft 34 with the fixed gear wheel 72 on the input shaft 52, thereby activating an $8^{th}$ forward gear (E-gear). The flux of force extends hereby from the input shaft 52 to the uncoupled section 34a of the output shaft 34 and via the gear wheel set 64 to the front axle differential 12.

The dual clutch K2 is again preferably constructed as a conventional dual-synchronous clutch.

When the interaxle differential 32 is designed in a conventional manner as a limited-slip differential, an all-wheel-drive can temporarily implemented for the gears 4 to 7 in a switching position of the dual clutch K2 where the section 34a is connected with the additional output shaft 34, wherein the flux of force extends rearward via the driven shaft 58 and the gear wheel set 64 to the output shaft 34 and via the limited-slip function of the interaxle differential 32 from the output shaft 34 to the output shaft 36 and to the rear wheels of the motor vehicle.

The output shaft 34 is disconnected and uncoupled from the gear wheel set 64 in the neutral position of the dual clutch K2.

As a result, the $8^{th}$ forward gear can also only drive the front axle differential 12, because the output shaft 34 to the interaxle differential 32 is also uncoupled in the corresponding switch position of the dual clutch K2.

The invention is not limited to the aforedescribed exemplary embodiments. The clutch K and/or the dual clutch K2 may also be constructed as a hydraulically controls multi-disk clutch. The described partial gearboxes may optionally also be housed in two gearbox housings, with a suitable connection (for example plug-in connections) between the driving shafts and the driven shafts.

What is claimed is:

1. A drive arrangement for a motor vehicle having two driven axles, wherein at least one of the two driven axles is constructed for connection and disconnection, the drive arrangement comprising:
a variable speed transmission having at least one input shaft, two driven shafts, with each driven shaft driving a corresponding axle of the two driven axles of the motor vehicle, and at least several forward gears constructed to be switched via gear wheels and synchronous clutches, said variable speed transmission being divided into two sub-transmissions, wherein a first sub-transmission drives exclusively a first axle of the motor vehicle via a first driven shaft and via a first portion of the forward gears, and wherein a second sub-transmission drives both the first axle via the first driven shaft and a second axle of the motor vehicle via a second driven shaft via a second portion of the forward gears.

2. The drive arrangement of claim 1, wherein the second sub-transmission additionally drives a reverse gear.

3. The drive arrangement of claim 1, wherein the second portion of the forward gears comprises a lowest forward gear.

4. The drive arrangement of claim 1, wherein the second portion of the forward gears comprises two or three lowest forward gears.

5. The drive arrangement of claim 1, further comprising a common transmission housing accommodating the two sub-transmissions and coaxially supporting the two driven shafts, and a switchable clutch constructed to connect the two driven shafts with one another.

6. The drive arrangement of claim 5, wherein the switchable clutch is a dual-synchronous clutch having two switching positions, wherein in a first switching position the two driven shafts are coupled with one another and in a second switching position an additional forward gear is connected, which drives only the first axle via the first driven shaft.

7. The drive arrangement of claim 6, wherein the additional forward gear is a stepped-up E-gear.

8. The drive arrangement of claim 5, wherein the second driven shaft is a hollow shaft which is drivingly connected to a downstream interaxle differential having a first driven element coupled with the at least one axle constructed for connection and disconnection and a second driven element transmitting a reverse force through the hollow driven shaft and being constructed to be coupled with the first driven shaft via the switchable clutch.

9. The drive arrangement of claim 1, wherein the variable speed transmission is a dual-clutch transmission having two coaxially supported input shafts constructed to be alternatingly connected to an engine via a dual clutch, wherein the first sub-transmission drives exclusively the first axle via the first portion of the forward gears and a first driven shaft drives exclusively the first axle via the first portion of the forward gears and the second sub-transmission drives the second driven shaft, which is axis-parallel to the first driven shaft and additionally coupled with the first driven shaft via a gear wheel set, via the second sub-transmission.

10. The drive arrangement of claim 9, wherein the second driven shaft is constructed as a hollow shaft and drives a differential case of a downstream interaxle differential, which is coupled via a first output shaft with the second axle and is drivingly coupled to transmit a reverse force through the hollow second driven shaft with the first driven shaft via a second driven element by way of the gear wheel set.

11. The drive arrangement of claim 10, wherein switchable idler reels of the gears of the second sub-transmission are arranged on the hollow second driven shaft, thereby establishing a drive connection to the first driven shaft and to at least one of the second driven shaft and the second driven element for driving both axles without an additional switchable clutch.

12. The drive arrangement of claim 10, wherein a dual clutch having two switching positions for driving the first axle is arranged in the second driven shaft or in the second driven element of the interaxle differential, with the dual clutch coupling in a first switching position the two sub-transmissions with each other and in a second switching position actively connecting an additional forward gear with an idler gear wheel disposed on a driven shaft or on an output shaft and a fixed gear wheel disposed on one of the coaxially supported input shafts.

13. The drive arrangement of claim 10, wherein in a driving situation when only the first axle is driven, a forward gear driving both axles is temporarily connected via a second separation clutch of the dual-clutch device controlled in slip mode, when wheel slip is detected.

14. The drive arrangement of claim 10, wherein in a driving situation when only the first axle is driven, the second axle is temporarily controlled in all-wheel drive by connecting the second driven element via the gear wheel set and the dual clutch to the first driven shaft, wherein a flux of force extends directly via the interaxle differential constructed as limited-slip differential to the second output shaft and to the second axle.

* * * * *